(12) United States Patent
Nomura et al.

(10) Patent No.: US 11,267,166 B2
(45) Date of Patent: Mar. 8, 2022

(54) DEVICES, SYSTEMS, AND METHODS FOR GENERATING A SINGLE FIBER PATH OF A COMPOSITE MATERIAL

(71) Applicant: TOYOTA MOTOR ENGINEERING & MANUFACTURING NORTH AMERICA, INC., Plano, TX (US)

(72) Inventors: Tsuyoshi Nomura, Novi, MI (US); Ercan Mehmet Dede, Ann Arbor, MI (US); Yuqing Zhou, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 53 days.

(21) Appl. No.: 16/718,890

(22) Filed: Dec. 18, 2019

(65) Prior Publication Data
US 2021/0187789 A1 Jun. 24, 2021

(51) Int. Cl.
*B29B 15/12* (2006.01)
*B29B 11/16* (2006.01)
*G05B 15/02* (2006.01)
*B32B 5/26* (2006.01)
*B29C 70/08* (2006.01)

(52) U.S. Cl.
CPC ......... *B29B 15/122* (2013.01); *B29B 11/16* (2013.01); *G05B 15/02* (2013.01); *B29C 70/081* (2013.01); *B32B 5/26* (2013.01); *B32B 2260/021* (2013.01); *B32B 2260/046* (2013.01); *B32B 2262/106* (2013.01); *G05B 2219/40011* (2013.01); *G05B 2219/45196* (2013.01)

(58) Field of Classification Search
None
See application file for complete search history.

(56) References Cited

U.S. PATENT DOCUMENTS

| 7,200,912 B2 * | 4/2007 | Bouillon | B29C 66/721 29/432 |
|---|---|---|---|
| 8,317,958 B2 | 11/2012 | Joern et al. | |
| 8,722,201 B2 | 5/2014 | Schiebel et al. | |

(Continued)

FOREIGN PATENT DOCUMENTS

| WO | 2008012300 A1 | 1/2008 |
|---|---|---|
| WO | 2019180466 A1 | 9/2019 |

*Primary Examiner* — Umut Onat
(74) *Attorney, Agent, or Firm* — Dinsmore & Shohl LLP

(57) ABSTRACT

A method is disclosed and includes determining at least one of a height field and an orientation field of a fiber-reinforced structure. The fiber-reinforced structure includes a plurality of fiber portions and a polymer matrix. The method includes generating a reaction-diffusion representation of the fiber-reinforced structure. The reaction-diffusion representation indicates a concentration of at least one of the polymer matrix and the plurality of fiber portions. The method includes designating a reference fiber deposition path based on the reaction-diffusion representation. The method includes generating a continuous fiber deposition path based on the reference fiber deposition path. The method includes transmitting a signal representing the continuous fiber deposition path to a deposition device, the deposition device using the continuous fiber deposition path to deposit a fiber of the fiber-reinforced structure.

19 Claims, 6 Drawing Sheets

(56) References Cited

U.S. PATENT DOCUMENTS

| | | | |
|---|---|---|---|
| 9,255,827 B2* | 2/2016 | Eck | G01F 1/712 |
| 9,370,896 B2* | 6/2016 | Mark | B29C 69/001 |
| 9,920,456 B2* | 3/2018 | Shinmen | D01F 9/225 |
| 10,040,252 B2* | 8/2018 | Mark | B29C 70/525 |
| 10,837,127 B2* | 11/2020 | Kiriyama | D01F 6/38 |
| 10,912,327 B2* | 2/2021 | Villar | B01J 13/08 |
| 10,953,609 B1* | 3/2021 | Mark | B29C 70/384 |
| 2016/0161433 A1* | 6/2016 | Rutledge | G01N 33/005 |
| | | | 436/110 |
| 2016/0368213 A1* | 12/2016 | Mark | B29C 70/521 |
| 2017/0361497 A1 | 12/2017 | Crescenti Savall et al. | |
| 2019/0029369 A1 | 1/2019 | VanWagnen et al. | |
| 2019/0168451 A1* | 6/2019 | Mark | B29C 70/528 |
| 2019/0236220 A1* | 8/2019 | Nomura | G06F 30/20 |
| 2021/0034036 A1* | 2/2021 | Nomura | B29C 64/118 |

* cited by examiner

DEVICES, SYSTEMS, AND METHODS FOR GENERATING A SINGLE FIBER PATH OF A COMPOSITE MATERIAL

FIELD

The present specification generally relates to devices, systems, and methods for manufacturing fiber-reinforced structures and, more particularly, to generating a single fiber path of a fiber-reinforced composite material.

BACKGROUND

Fiber-reinforced structures, such as carbon fiber-reinforced plastics, are ubiquitous in various industries, such as the automotive industry. Fiber-reinforced structures are often incorporated in various systems, devices, and apparatuses due to their high strength-to-weight ratio, high directional strength, high corrosion resistance, low thermal conductivity, low coefficient of thermal expansion, and high impact strength. During a manufacturing process of a fiber-reinforced structure, the placement and orientation of a plurality of fibers may be determined using a topology optimization process. However, conventional manufacturing processes of fiber-reinforced structures do not provide for the placement and orientation of a single fiber. Accordingly, a need exists for systems, methods, and devices that provide for the manufacture of a fiber-reinforced structure having a single fiber.

SUMMARY

In an aspect, a method includes determining, using one or more processors, at least one of a height field and an orientation field of a fiber-reinforced structure, wherein the fiber-reinforced structure includes a plurality of fiber portions and a polymer matrix. The method includes generating, using the one or more processors, a reaction-diffusion representation of the fiber-reinforced structure, wherein the reaction-diffusion representation indicates a concentration of at least one of the polymer matrix and the plurality of fiber portions. The method includes designating, using the one or more processors, a reference fiber deposition path based on the reaction-diffusion representation. The method includes generating, using the one or more processors, a continuous fiber deposition path based on the reference fiber deposition path. The method includes transmitting, using the one or more processors, a signal representing the continuous fiber deposition path to a deposition device, the deposition device using the continuous fiber deposition path to deposit a fiber of the fiber-reinforced structure.

In an aspect, a system includes one or more processors and one or more nontransitory computer-readable mediums storing machine-readable instructions. Executing the machine-readable instructions causes the one or more processors to determine at least one of a height field and an orientation field of a fiber-reinforced structure, wherein the fiber-reinforced structure includes a plurality of fiber portions and a polymer matrix. Executing the machine-readable instructions causes the one or more processors to generate a reaction-diffusion representation of the fiber-reinforced structure, wherein the reaction-diffusion representation indicates a concentration of at least one of the polymer matrix and the plurality of fiber portions. Executing the machine-readable instructions causes the one or more processors to designate a reference fiber deposition path based on the reaction-diffusion representation. Executing the machine-readable instructions causes the one or more processors to generate a continuous fiber deposition path based on the reference fiber deposition path. Executing the machine-readable instructions causes the one or more processors to transmit a signal representing the continuous fiber deposition path to a deposition device, the deposition device using the continuous fiber deposition path to deposit a fiber of the fiber-reinforced structure.

In an aspect, a method includes determining, using one or more processors, at least one of a height field and an orientation field of a fiber-reinforced structure, wherein the fiber-reinforced structure includes a plurality of fiber portions and a polymer matrix. The method includes generating, using the one or more processors, a reaction-diffusion representation of the fiber-reinforced structure, wherein the reaction-diffusion representation indicates a concentration of at least one of the polymer matrix and the plurality of fiber portions. The method includes generating, using the one or more processors, a two-phase representation of the fiber-reinforced structure based on the reaction-diffusion representation. The method includes generating, using the one or more processors, a continuous fiber deposition path based on the two-phase representation. The method includes transmitting, using the one or more processors, a signal representing the continuous fiber deposition path to a deposition device, the deposition device using the continuous fiber deposition path to deposit a fiber of the fiber-reinforced structure.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Referring to the figures, embodiments of the present disclosure generally relate to devices, systems, and methods for manufacturing a fiber-reinforced structure having a single fiber. In some embodiments and as described below in further detail, a single path generation system determines a height field and an orientation field of a fiber-reinforced structure during a topology optimization process. Subsequently, the single path generation system generates a reaction-diffusion representation of the fiber-reinforced structure, and the single path generation system determines a reference fiber deposition path based on the reaction-diffusion representation. The reference fiber deposition path may include a continuous portion and one or more disconnected fiber portions, and each of the one or more disconnected fiber portions may be joined with the continuous portion to form a continuous fiber deposition path.

Furthermore, in some embodiments and as described below in further detail, a single path generation system determines a height field and an orientation field of a fiber-reinforced structure during a topology optimization process. Subsequently, the single path generation system generates a reaction-diffusion representation of the fiber-reinforced structure, and the single path generation system generates a two-phase representation based on the reaction-diffusion representation. The continuous fiber deposition path may be generated by identifying and tracing a perimeter of the two-phase representation.

Accordingly, the generation of the continuous fiber deposition path enables the fiber-reinforced structure to be formed having a single, continuous fiber, thereby increasing the aspect ratio (e.g., length-to-diameter ratio of the fiber) of the fiber-reinforced structure. As such, the single, continuous fiber enables an operator to improve the strength-to-weight ratio, directional strength, impact strength and/or other structural characteristics of the like of the fiber-reinforced structure compared to fiber-reinforced structures having multiple discontinuous fibers and/or a relatively smaller aspect ratio. Furthermore, the generation of the continuous fiber deposition path improves the efficiency and speed during a manufacturing process of the fiber-reinforced structure.

As used herein, the phrase "longitudinal direction" refers to the forward-rearward direction of the fiber-reinforced structure (i.e., in the +/−X-direction as depicted in FIGS. 4A-4D and 6A-6B). The phrase "vertical direction" refers to the upward-downward direction of the fiber-reinforced structure (i.e., in the +/−Y-direction as depicted in FIGS. 4A-4D and 6A-6B). The phrase "lateral direction" refers to the cross fiber-reinforced structure direction of the fiber-reinforced structure (i.e., in the +/−Z-direction as depicted in FIGS. 4A-4D and 6A-6B), and is transverse to the longitudinal direction.

Figure 1:
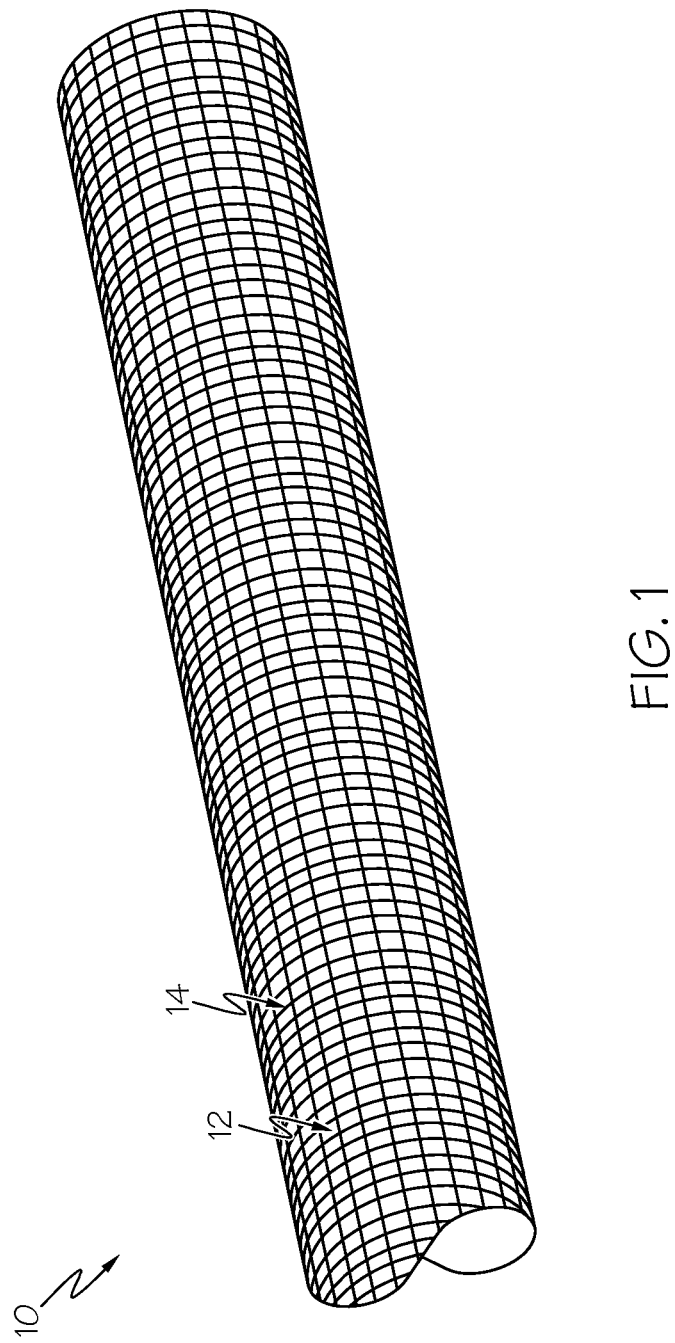
FIG. 1 schematically depicts an illustrative composite material according to some embodiments shown and described herein.

Referring now to FIG. 1, an illustrative fiber-reinforced structure 10 is schematically depicted. In some embodiments, the fiber-reinforced structure 10 includes a polymer matrix 12 and a single fiber 14. In some embodiments, the polymer matrix 12 includes one or more polymers or combinations of polymers, such as a resin (nylon, polyester, polyurethane, vinyl, vinyl ester, epoxy, and/or the like). In various embodiments, the single fiber 14 is one of a carbon fiber, a glass fiber, an aramid fiber, and/or the like.

The fiber-reinforced structure 10 may be included in various systems, devices, and apparatuses due to their high strength-to-weight ratio, high directional strength, high corrosion resistance, low thermal conductivity, low coefficient of thermal expansion, and high impact strength. In some embodiments, the fiber-reinforced structure 10 may be included within various components of a vehicle. As a non-limiting example, the fiber-reinforced structure 10 may be included within a chassis of a car, an exterior of the car (such as a hood of the car, a bumper of the car, a roof of the car, and/or the like), and/or an interior of a car (such as a dash panel of the car, a center console of the car, and/or the like). In some embodiments, the fiber-reinforced structure 10 may be included within various components of other vehicle types including, but not limited to, a boat, a plane, an unmanned aerial vehicle, and the like. It should be understood that the fiber-reinforced structure 10 may be included within various apparatus types, such as medical equipment, sports equipment, consumer goods, and/or the like.

The fiber-reinforced structure 10 may be formed using various manufacturing processes. In some embodiments, the fiber-reinforced structure 10 may be formed by depositing the single fiber 14 into the polymer matrix 12 using a deposition device (shown below in FIG. 2) that executes an additive manufacturing technique including, but not limited to, an automated tape layout process, continuous fiber printing process, a tailored fiber placement process, and the like. The single fiber 14 may be deposited into the polymer matrix 12 in accordance with a continuous fiber deposition path, which is described below in further detail.

Figure 2:
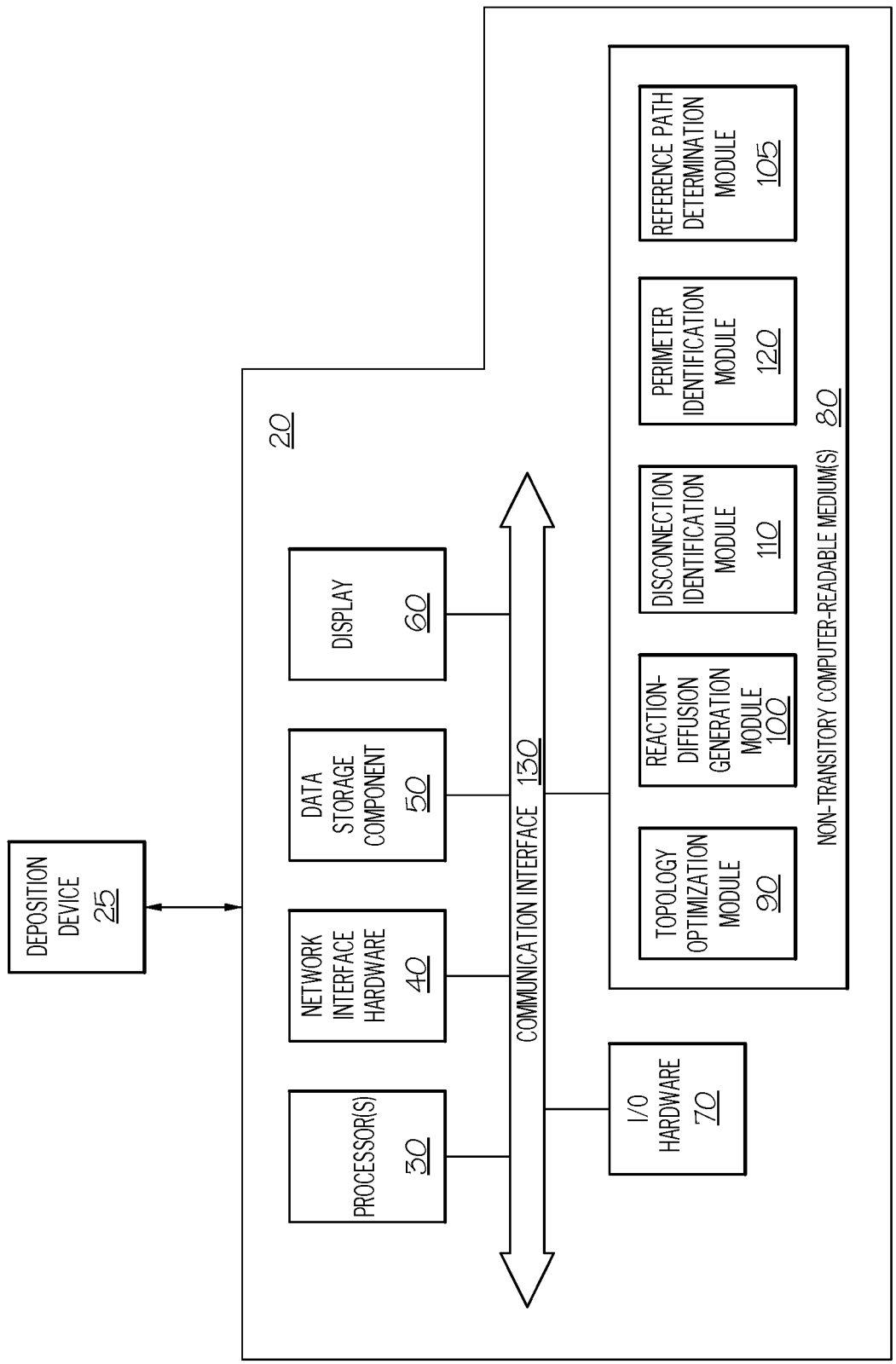
FIG. 2 schematically depicts a functional block diagram of illustrative modules and components contained within a single fiber generation system according to some embodiments shown and described herein.

With reference to FIG. 2, an example embodiment of a single fiber generation system 20 is schematically depicted showing additional components contained therein. In some embodiments, the single fiber generation system 20 may communicatively coupled to a deposition device 25 that executes various additive manufacturing including, but not limited to, an automated tape layout process, continuous fiber printing process, a tailored fiber placement process, and the like. Accordingly, the single fiber generation system 20 may transmit instructions to the deposition device 25 associated with a determined continuous fiber deposition path, as described below in further detail. It should be understood that the single fiber generation system 20 may be included within the deposition device 25 in other embodiments.

The single fiber generation system 20 generally includes one or more processors 30, network interface hardware 40, data storage component 50, a display 60, input/output hardware 70, and one or more non-transitory computer-readable mediums 80, and a communication interface 130. The one or more non-transitory computer-readable mediums 80 include a topology optimization module 90, a reaction-diffusion generation module 100, a reference path determination module 105, a disconnection identification module 110, and a perimeter identification module 120. The components of the single fiber generation system 20 may be physically and/or communicatively coupled through the communication interface 130.

The communication interface 130 is formed from any medium that is configured to transmit a signal. As non-limiting examples, the communication interface 130 is formed of conductive wires, conductive traces, optical waveguides, or the like. The communication interface 130 may also refer to the expanse in which electromagnetic radiation and their corresponding electromagnetic waves are propagated. Moreover, the communication interface 130 may be formed from a combination of mediums configured to transmit signals. In one embodiment, the communication interface 130 includes a combination of conductive traces, conductive wires, connectors, and buses that cooperate to permit the transmission of electrical data signals to and from the various components of the single fiber generation system 20. Additionally, it is noted that the term "signal" means a waveform (e.g., electrical, optical, magnetic, mechanical or electromagnetic) configured to travel through a medium, such as DC, AC, sinusoidal-wave, triangular-wave, square-wave, vibration, and the like.

The one or more processors 30, each of which may be a computer processing unit (CPU), may receive and execute machine-readable instructions stored in the one or more non-transitory computer-readable mediums 80. As a non-limiting example, the one or more processors 30 may be one of a shared processor circuit, dedicated processor circuit, or group processor circuit. As described herein, the term "shared processor circuit" refers to a single processor circuit that executes some or all machine-readable instructions from the multiple modules. As described herein, the term "group processor circuit" refers to a processor circuit that, in combination with additional processor circuits, executes some or all machine-executable instructions from the multiple modules of the one or more non-transitory computer-readable mediums 80. References to multiple processor circuits encompass multiple processor circuits on discrete dies, multiple processor circuits on a single die, multiple cores of a single processor circuit, multiple threads of a single processor circuit, or a combination of the above.

The network interface hardware 40 may include and/or be configured to communicate with any wired or wireless networking hardware, including an antenna, a modem, a LAN port, a wireless fidelity (Wi-Fi) card, a WiMax® card, a long term evolution (LTE) card, a ZigBee® card, a Bluetooth® chip, a USB card, mobile communications hardware, and/or other hardware for communicating with other networks and/or devices. The data storage component 50 is communicatively coupled to the one or more processors 30. As a non-limiting example, the data storage component 50 may include one or more database servers that support NoSQL, MySQL®, Oracle®, SQL Server, NewSQL, or the like.

The display 60 may generate a graphical representation of the continuous fiber deposition path, as described below in further detail. The input/output hardware 70 may include a basic input/output system (BIOS) that interacts with hardware of the single fiber generation system 20, device drivers that interact with particular devices of the single fiber generation system 20, one or more operating systems, user applications, background services, background applications, and/or the like.

The one or more non-transitory computer-readable mediums 80 are communicatively coupled to the one or more processors 30. As a non-limiting example, the one or more non-transitory computer-readable mediums 80 may be one of a shared memory circuit, dedicated memory circuit, or group memory circuit. As described herein, the term "shared memory circuit" refers to a single memory circuit that stores some or all machine-readable instructions from multiple modules, which are described below in further detail. As described herein, the term "group memory circuit" refers to a memory circuit that, in combination with additional memories, stores some or all machine-readable instructions from the multiple modules. Non-limiting examples of the one or more non-transitory computer-readable mediums 80 include random access memory (including SRAM, DRAM, and/or other types of random access memory), read-only memory (ROM), flash memory, registers, compact discs (CD), digital versatile discs (DVD), and/or other types of storage components.

A description of the various modules of the single fiber generation system 20 will now be provided with reference to FIG. 2. As described herein, the term module may refer to, be part of, or include: an Application Specific Integrated Circuit (ASIC); a digital, analog, or mixed analog/digital discrete or integrated circuit; a combinational logic circuit; a field programmable gate array (FPGA); a processor circuit that executes machine-readable instructions; a memory circuit that stores machine-readable instructions executed by the processor circuit; other suitable hardware components that provide the described functionality; or a combination of some or all of the above.

The topology optimization module 90 contains programming instructions for determining at least one of a height and orientation of the fiber-reinforced structure 10. Further details regarding the operation of the topology optimization module 90 are provided below in FIGS. 3, 4A-4D, 5, and 6A-6B, for example.

The reaction-diffusion generation module 100 contains programming instructions for generating a reaction-diffusion representation of the fiber-reinforced structure 10 and a reference fiber deposition path based on the reaction-diffusion representation of the fiber-reinforced structure 10. In some embodiments, the reaction-diffusion generation module 100 contains programming instructions for generating a two-phase representation of the reaction-diffusion representation. Further details regarding the operation of the reaction-diffusion generation module 100 are provided below in FIGS. 3, 4A-4D, 5, and 6A-6B, for example.

The reference path determination module 105 contains programming instructions for designating a reference fiber deposition path based on the reaction-diffusion representation. Further details regarding the operation of the reference path determination module 105 are provided below in FIGS. 3 and 4A-4D, for example.

The disconnection identification module 110 contains programming instructions for identifying one or more disconnected fiber portions and joins the identified disconnected fiber portions with the reference fiber deposition path. Further details regarding the operation of the disconnection identification module 110 are provided below in FIGS. 3 and 4A-4D, for example.

The perimeter identification module 120 contains programming instructions for identifying and tracing a perimeter of a phase generated by the reaction-diffusion generation module 100. Further details regarding the operation of the perimeter identification module 120 are provided below in FIGS. 5 and 6A-6B, for example.

Figure 3:
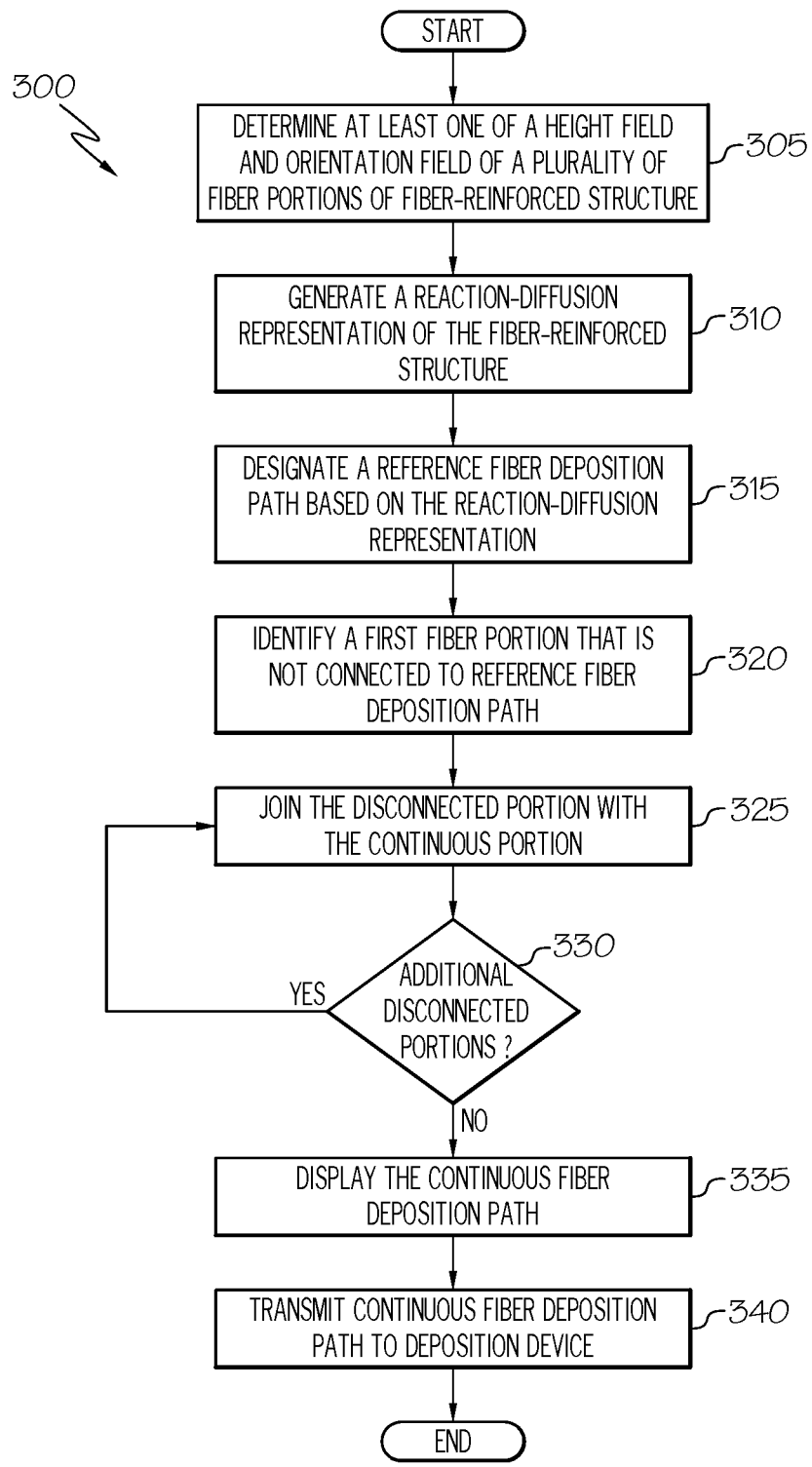
FIG. 3 depicts a flow diagram of an illustrative method of generating a continuous fiber deposition path according to some embodiments shown and described herein.

With reference to FIG. 3, a flow diagram of an illustrative method 300 of generating a continuous fiber deposition path is depicted. While the blocks shown in FIG. 3 are shown as all-occurring and in a particular order, in other embodiments, one or more of the blocks may not be performed, and in some embodiments, one or more of the blocks may be performed in a different order as shown and described herein.

Referring to FIGS. 1-3 and 4A-4D, at block 305, the one or more processors 30 determine, by executing the programming instructions of the topology optimization module 90, at least one of a height field and an orientation field of a plurality of fiber portions of the fiber-reinforced structure 10. A non-limiting example of the height field and the orientation field of the plurality of fiber portions are schematically depicted in graphical representation 400 of the fiber-reinforced structure 10 in FIG. 4A.

As used herein, the phrase "height field of the plurality of fiber portions of the fiber-reinforced structure" refers to a distance from a nominal plane in which each of the plurality of fiber portions extends in the lateral direction (e.g., +/−Z-direction), thereby indicating an overall topology of the fiber-reinforced structure 10. As used herein, the phrase "orientation of the plurality of fiber portions of the fiber-reinforced structure" refers to one or more angles between a center line of each of the plurality of fiber portions and a longitudinal axis (e.g., the X-axis illustrated in FIGS. 4A-4D).

As a non-limiting example, the graphical representation 400 includes a first fiber portion 402-1, a second fiber portion 402-2, a third fiber portion 402-3, a fourth fiber portion 402-4, a fifth fiber portion 402-5, and a sixth fiber portion 402-6 (collectively referred to as plurality of fiber portions 402). Furthermore, the graphical representation 400 includes a polymer matrix portion 404. In various embodiments, the graphical representation 400 may be displayed using the display 60.

Figure 4A:
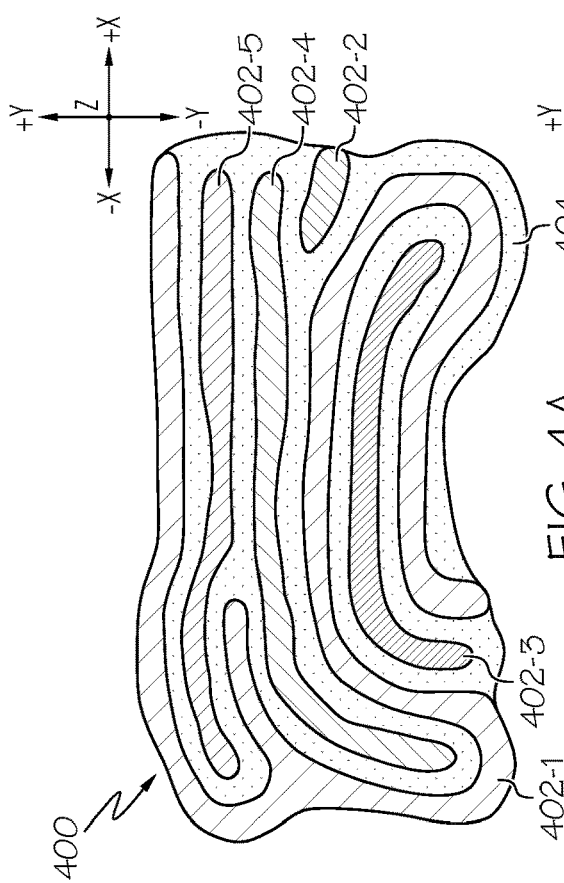
FIG. 4A schematically depicts a reference fiber deposition path of a composite material according to some embodiments shown and described herein.
Figure 4B:
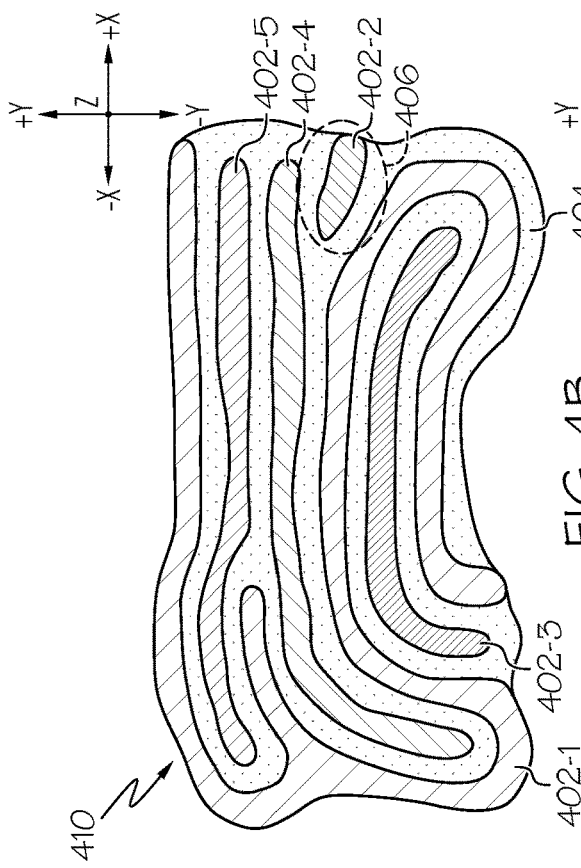
FIG. 4B schematically depicts a first discontinuous portion of the reference fiber deposition path of a composite material according to some embodiments shown and described herein.

In some embodiments, the orientation of each of the plurality of fiber portions 402 comprises a plurality of angles at various locations within the graphical representation 400 due to the curvilinear geometry of the plurality of fiber portions 402, as illustrated in FIG. 4A. It should be understood that the orientation of each of the plurality of fiber portions 402 may include one angle if each of the plurality of fiber portions 402 have a linear and/or unidirectional geometry.

In some embodiments, the one or more processors 30 may designate, by executing the programming instructions of the topology optimization module 90, the orientation and/or height fields of the plurality of fiber portions of the fiber-reinforced structure 10 using membership variables. The membership variable enables optimization of decomposition of the fiber-reinforced structure 10 without a prescribed partitioning. Accordingly, the partitioning may be performed by executing the programming instructions of the topology optimization module 90.

As a non-limiting example, the membership variable has three design fields. It should be understood that more or fewer design fields may be utilized depending on the design parameters (e.g., one or more additional design fields). The design fields may include a membership field, the height field, and the orientation field. The membership field represents a fractional membership of each location within the graphical representation 400 and is the prescribed maximum allowable number of the plurality of fiber portions 402 (e.g., six fiber portions 402). The height field may be represented by a regularized Heaviside function (e.g., the application of a Helmholtz filter to the Heaviside function). As used herein, the Helmholtz filter refers to an eigenvalue function that is a partial linear differential representation of the height field. As used herein, the Heaviside function refers to a unit step function and/or an integral of the Dirac delta function that is representative of the height field of the plurality of fiber portions 402. The orientation field may be represented as a Cartesian vector representing the orientation at each location of the plurality of fiber portions 402. A radius of the regularization filter may be applied to the orientation field such that the resulting orientation for each of the plurality of fiber portions 402 is curvilinear, as illustrated in FIG. 4A.

Still referring to FIGS. 1-3 and 4A-4D, at block 310, the one or more processors 30 generate, by executing the programming instructions of the reaction-diffusion generation module 100, a reaction-diffusion representation of the fiber-reinforced structure 10. As used herein, the phrase "reaction-diffusion representation" refers to a graphical and/or mathematical representation of the relative concentrations of the plurality of fiber portions 402 and the polymer matrix portion 404, where the graphical and/or mathematical representation is generated by simulating the diffusion of one or more substances into the fiber-reinforced structure 10. In some embodiments, generating the reaction-diffusion representation of the fiber-reinforced structure 10 includes generating and applying a hatching pattern, heat map, and/or other similar process that illustrates the relative concentrations of each of the plurality of the fiber portions 402 and the polymer matrix portion 404. As a non-limiting example, the relative concentration of each of the plurality of fiber portions 402 and the polymer matrix portion 404 are illustrated by various hatching patterns, as shown in graphical representation 400 in FIG. 4A and graphical representation 410 in FIG. 4B, and the relative concentration of each of the plurality of fiber portions 402 and the polymer matrix portion 404 are illustrated using the display 60.

In some embodiments, the one or more processors 30 generate, by executing the programming instructions of the reaction-diffusion generation module 100, the reaction-diffusion representation of the fiber-reinforced structure 10 by generating a Turing pattern. As used herein, the phrase "Turing pattern" refers to a spatial pattern that occurs spontaneously when simulating the diffusion of one or more substances into the fiber-reinforced structure 10. As a non-limiting example, the Turing pattern may be generated by simulating, using a series of dimensionless equations, the diffusion of a predetermined substance into the plurality of fiber portions 402 and the polymer matrix portion 404 and generating the hatching pattern based on the corresponding permeability of the plurality of fiber portions 402 and the polymer matrix portion 404.

In some embodiments, the one or more processors 30 generate, by executing the programming instructions of the reaction-diffusion generation module 100, the reaction-diffusion representation of the fiber-reinforced structure 10 by executing a Gray-Scott Algorithm. As a non-limiting example, the Gray-Scott algorithm includes simulating the diffusion, feed rate, removal rate, and/or reaction between a predetermined substance and both of the plurality of fiber portions 402 and the polymer matrix portion 404.

Referring to FIGS. 1-3 and 4A-4D, at block 315, the one or more processors 30 designate, by executing the programming instructions of the reference path determination module 105, a reference fiber deposition path based on the reaction-diffusion representation of the fiber-reinforced structure 10. In some embodiments, the one or more processors 30 may identify, by executing image processing programming instructions of the reference path determination module 105 (e.g., feature extraction algorithms, pattern recognition algorithms, and/or the like) a number of the plurality of fiber portions 402. In various embodiments, the one or more processors 30 may then determine, by executing programming instructions of the reference path determination module 105 corresponding to calculating a rectification of a curve function, a length of each of the plurality of fiber portions 402.

Furthermore, the one or more processors 30 may select, by executing the programming instructions of the reference path determination module 105, the reference fiber deposition path based on the fiber portion having the largest length. As a non-limiting example and as shown in FIGS. 4A-4D, the one or more processors 30 may designate the reference fiber deposition path as the first fiber portion 402-1, as it has the largest length of the plurality of fiber portions 402. It should be understood that the one or more processors 30 may designate the reference fiber deposition path based on other variables in other embodiments, such as the orientation field, the height field, and the like.

Referring to FIGS. 1-3 and 4B, at block 320, the one or more processors 30 identify, by executing the programming instructions of the disconnection identification module 110, a first disconnected fiber portion that is not connected to the reference fiber deposition path. As a non-limiting example and as indicated by dashed circle 406 of graphical representation 410, the one or more processors 30 may determine, by executing various image processing algorithms of the disconnection identification module 110 (e.g., a contour detection algorithm), the second fiber portion 402-2 is not connected to the reference fiber deposition path (e.g., the first fiber portion 402-1), as the second fiber portion 402-2 and the reference fiber deposition path are separated by the polymer matrix portion 404. Furthermore, the one or more processors 30 may determine that the third fiber portion 402-3, the fourth fiber portion 402-4, and the fifth fiber portion 402-5 are not connected to the reference fiber deposition path (e.g., the first fiber portion 402-1), as the reference fiber deposition path and each of the above-identified discontinuous fiber portions are separated by the polymer matrix portion 404.

Figure 4C:
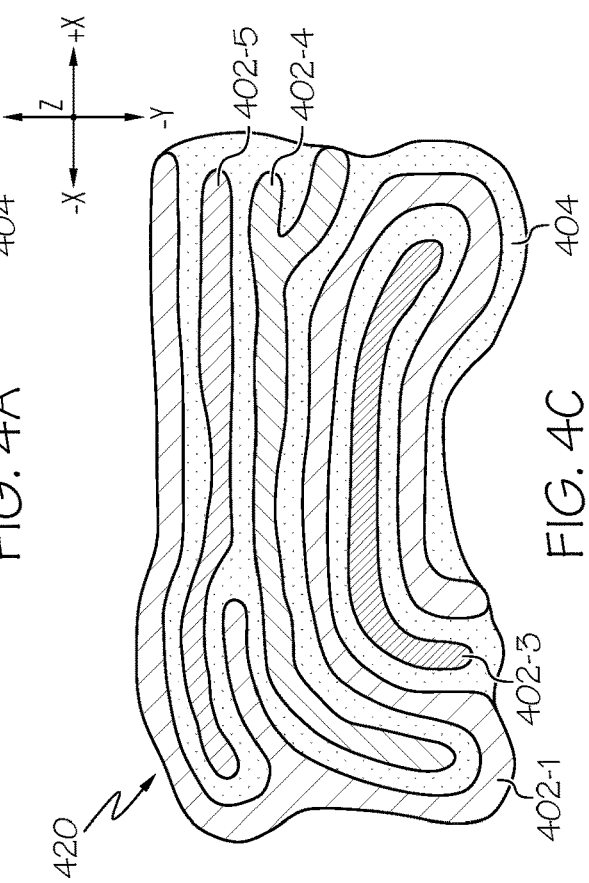
FIG. 4C schematically depicts a first discontinuous portion of the reference fiber deposition path joined to a continuous portion of the reference fiber deposition path according to some embodiments shown and described herein.

Referring to FIGS. 1-3 and 4A-4D, at block 325, the one or more processors 30 join, by executing the programming instructions of the disconnection identification module 110, the identified disconnected fiber portion (e.g., the second fiber portion 402-2) with the reference fiber deposition path (e.g., the first fiber portion 402-1), as shown in graphical representation 415 in FIG. 4C. In some embodiments, the identified disconnected fiber portion (e.g., the second fiber portion 402-2) may be joined with the reference fiber deposition path (e.g., the first fiber portion 402-1) at a location corresponding to a minimum distance between the identified disconnected fiber portion (e.g., the second fiber portion 402-2) and the reference fiber deposition path (e.g., the first fiber portion 402-1).

Referring to FIGS. 1-3 and 4A-4D, at block 330, the one or more processors 30 determine, by executing the programming instructions of the disconnection identification module 110, whether additional disconnected fiber portions exist. As a non-limiting example, the one or more processors 30 may determine that additional disconnected fiber portions exist when a plurality of disconnected fiber portions are identified at block 320. As another non-limiting example, the one or more processors 30 may determine that no additional disconnected fiber portions exist when only one disconnected fiber portion is identified at block 320 and/or each of the plurality of disconnected fiber portions have been joined to the reference fiber deposition path at block 325. If additional disconnected fiber portions exist, the method 300 proceeds to block 325; otherwise, the method 300 proceeds to block 335.

Figure 4D:
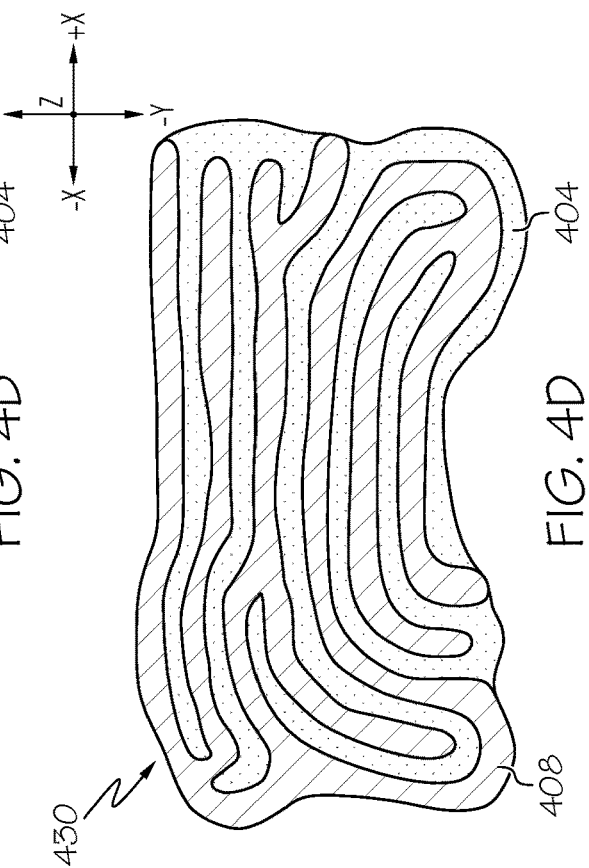
FIG. 4D schematically depicts a continuous fiber deposition path according to some embodiments shown and described herein.

Still referring to FIGS. 1-2 and 4D, at block 335, the display 60 displays a continuous fiber deposition path 408, as shown in graphical representation 420 in FIG. 4D. In some embodiments, the single fiber generation system 20 displays the continuous fiber deposition path 408 shown in graphical representation 420 using the display 60. Still referring to FIGS. 1-2 and 4D, at block 340, the single fiber generation system 20 transmits a signal representing the continuous fiber deposition path to the deposition device 25, where the signal causes the deposition device 25 to display the continuous fiber deposition path 408 shown in graphical representation 420. Furthermore, the signal may include instructions that cause the deposition device 25 to execute an additive manufacturing technique in accordance with the continuous fiber deposition path 408, thereby enabling the deposition device 25 to generate the fiber-reinforced structure 10 with a single, continuous fiber.

Figure 5:
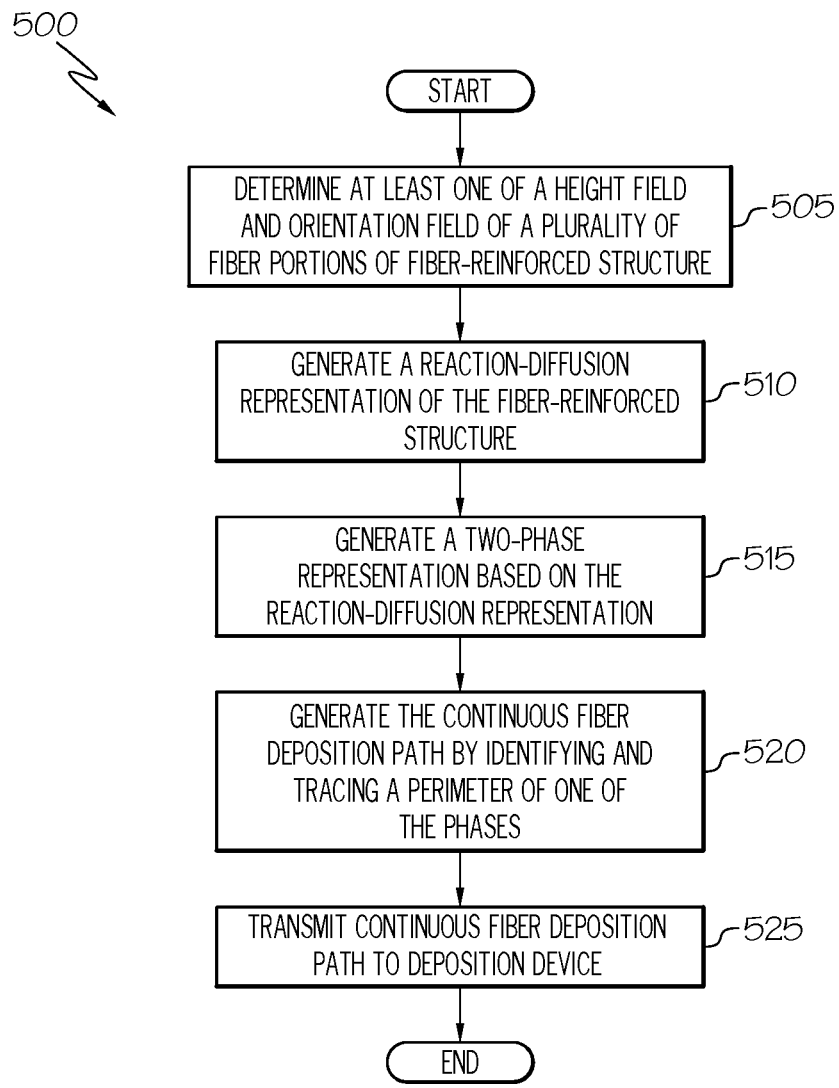
FIG. 5 depicts a flow diagram of another illustrative method of generating a continuous fiber deposition path according to some embodiments shown and described herein.

With reference to FIG. 5, a flow diagram of an illustrative method 500 of generating a continuous fiber deposition path is depicted. While the blocks shown in FIG. 5 are shown as all-occurring and in a particular order, in other embodiments, one or more of the blocks may not be performed, and in some embodiments, one or more of the blocks may be performed in a different order as shown and described herein.

Referring to FIGS. 1-2, and 5, at block 505, the one or more processors 30 determine, by executing the programming instructions of the topology optimization module 90, at least one of a height field and an orientation of a plurality of fiber portions of the fiber-reinforced structure 10. As described above, the topology optimization module 90 may designate the orientation and/or height fields of the plurality of fiber portions of the fiber-reinforced structure 10 using membership variables.

Still referring to FIGS. 1-2, and 5, at block 510, the one or more processors 30 generate, by executing the programming instructions of the reaction-diffusion generation module 100, a reaction-diffusion representation of the fiber-reinforced structure 10. As described above, generating the reaction-diffusion representation of the fiber-reinforced structure 10 includes generating and applying a hatching pattern, heat map, and/or other similar process that illustrates the relative concentrations of each of the plurality of the fiber portions and the polymer matrix portion. As a non-limiting example, the one or more processors 30 generate the reaction-diffusion representation of the fiber-reinforced structure 10 by generating a Turing pattern or by executing the Gray-Scott algorithm, as described above.

Figure 6A:
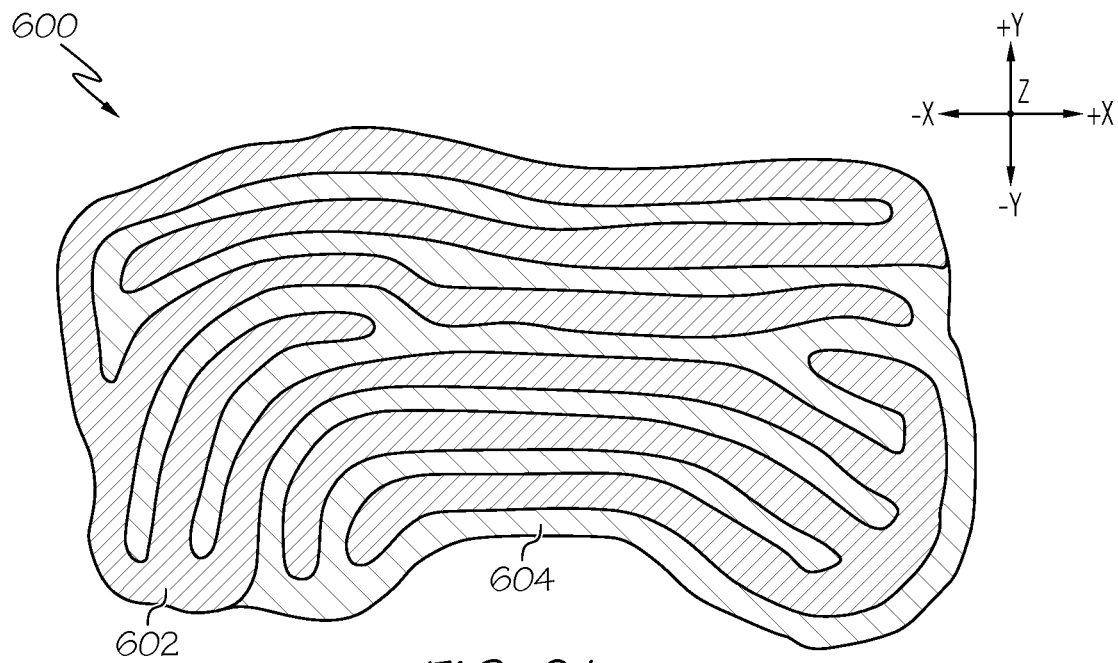
FIG. 6A schematically depicts another reference fiber deposition path of a composite material according to some embodiments shown and described herein.

Referring to FIGS. 1-2, 5, and 6A, at block 515, the one or more processors 30 generate, by executing the programming instructions of the reaction-diffusion generation module 100, a two-phase representation 600 based on the reaction-diffusion representation of the fiber-reinforced structure 10. As depicted in FIG. 6A, the two-phase representation 600 includes a first phase 602 and a second phase 604. In some embodiments, the first phase 602 may be represented with a first color and/or first hatching pattern, and the second phase 604 may be represented with a second color and/or second hatching pattern. It should be understood that the first phase 602 and the second phase 604 may be represented using any suitable manner to distinguish the first phase 602 and the second phase 604 in other embodiments.

In some embodiments, generating the two-phase representation 600 includes applying a maximum length constraint, a minimum length constraint, and/or a non-cavity constraint to the reaction-diffusion representation in order to connect each of the plurality of fiber portions. As used herein, the phrase "maximum length constraint" refers to a maximum length (e.g., a maximum length as determined by a rectification of a curve function) of each of the plurality of fiber portions and/or the polymer matrix. As used herein, the phrase "minimum length constraint" refers to a minimum length (e.g., a minimum length as determined by a rectification of a curve function) of the plurality of fiber portions and/or the polymer matrix. As used herein, the phrase "non-cavity constraint" refers to a condition in which none of the plurality of fiber portions is surrounded by the polymer matrix portion, and no portion of the polymer matrix is surrounded by any one of the plurality of fiber portions.

As a non-limiting example, the reaction-diffusion representation may include a plurality of fiber portions and a polymer matrix portion (not shown). Subsequently, the one or more processors 30 apply the maximum length constraint to the reaction-diffusion representation in order to generate one of the first phase 602 and the second phase 604. In embodiments, applying the maximum length constraint causes the one or more processors 30 to identify a continuous portion of the reaction-diffusion representation having a length that is greater than the maximum length constraint (e.g., the polymer matrix portion of the reaction-diffusion representation, which is continuous, may have a length that is greater than the maximum length constraint, thereby causing the reaction-diffusion generation module 100 to generate the second phase 604, which is representative of the polymer matrix).

Subsequently, the one or more processors 30 apply the minimum length constraint to the reaction-diffusion representation in order to generate one of the first phase 602 and the second phase 604. In embodiments, applying the maximum length constraint causes the reaction-diffusion generation module 100 to identify and join the remaining portions of the reaction-diffusion representation having a length that is less than the minimum length constraint (e.g., the plurality of fiber portions of the reaction-diffusion representation may each have a length that is less than the minimum length constraint, thereby causing the reaction-diffusion generation module 100 to generate the first phase 602 by joining each of the plurality of fiber portions).

In some embodiments, the one or more processors 30 apply the non-cavity constraint to the reaction-diffusion representation after the application of the minimum and maximum length constraints in order to remove any cavities within the two-phase representation 600. In some embodiments, the one or more processors 30 may initially identify, by executing image processing programming instructions of the reaction-diffusion generation module 100, any cavities within the two-phase representation 600 (e.g., the one or more processors 30 may identify each of the plurality of fiber portions that are completely surrounded by the polymer matrix portion, and/or the one or more processors 30 may identify a portion of the polymer matrix that is completely surrounded by any one of the plurality of fiber portions).

Subsequently, the one or more processors 30 may join any identified cavities with one of the first phase 602 and the second phase 604.

Figure 6B:
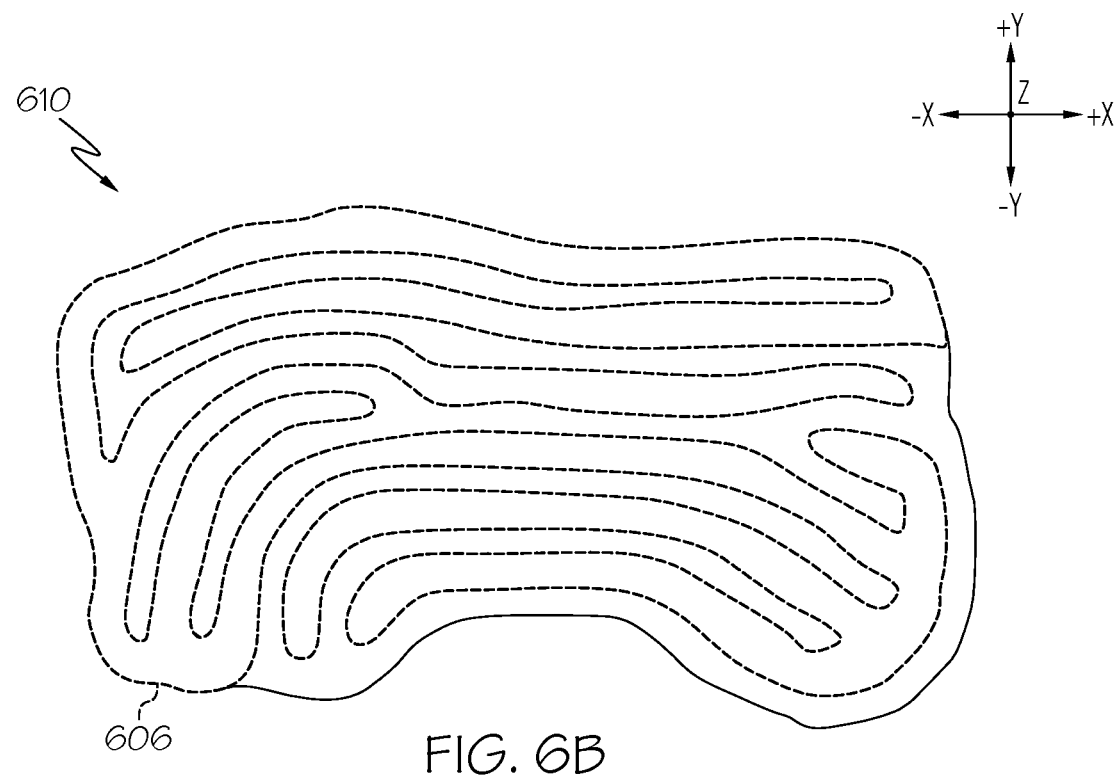
FIG. 6B schematically depicts another continuous fiber deposition path according to some embodiments shown and described herein.

Referring to FIGS. 1-2, 5, and 6B, at block 520, the one or more processors 30 generate, by executing the programming instructions of the perimeter identification module 120, the continuous fiber deposition path by identifying and tracing a perimeter 606 of one of the first phase 602 and the second phase 604, as shown in graphical representation 610 of FIG. 6B. While the perimeter 606 is illustrated as the perimeter of the first phase 602, it should be understood that the perimeter 606 may be illustrated as the perimeter of the second phase 604 in other embodiments. In some embodiments, the perimeter identification module 120 identifies and traces the perimeter 606 by executing various image processing algorithms (e.g., a contour detection algorithm) to determine a boundary of one of the first phase 602 and the second phase 604.

In various embodiments, the display 60 displays the continuous fiber deposition path (e.g., the perimeter 606 of one of the first phase 602 and the second phase 604), as shown in graphical representation 610 in FIG. 6B. In some embodiments, the single fiber generation system 20 displays the continuous fiber deposition path shown in graphical representation 610 using the display 60.

Referring to FIGS. 1-2, 5, and 6B, at block 525, the single fiber generation system 20 transmits a signal representing the continuous fiber deposition path to the deposition device 25, where the signal causes the deposition device 25 to display the continuous fiber deposition path shown in graphical representation 610. Furthermore, the signal may include instructions that cause the deposition device 25 to execute an additive manufacturing technique in accordance with the continuous fiber deposition path shown in graphical representation 610, thereby enabling the deposition device 25 to generate the fiber-reinforced structure 10 with a single, continuous fiber.

It should now be understood that the embodiments described herein relate to devices, systems, and methods for devices, systems, and methods for manufacturing the fiber-reinforced structure 10 having a single fiber and defining a corresponding continuous fiber deposition path in which the single fiber is deposited within the fiber-reinforced structure 10. Accordingly, the generation of the continuous fiber deposition path enables the fiber-reinforced structure 10 to be formed having a single, continuous fiber, thereby increasing the aspect ratio (e.g., length-to-diameter ratio of the fiber) of the fiber-reinforced structure. As such, the single, continuous fiber enables an operator to improve the strength-to-weight ratio, directional strength, impact strength and/or other structural characteristics of the like of the fiber-reinforced structure 10 compared to fiber-reinforced structures having multiple discontinuous fibers and a relatively smaller aspect ratio.

The functional blocks and/or flowchart elements described herein may be translated into machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either an FPGA configuration or an ASIC, or their equivalents. Accordingly, the functionality described herein may be implemented in any conventional computer programming language, as pre-programmed hardware elements, or as a combination of hardware and software components.

It will be apparent to those skilled in the art that various modifications and variations can be made without departing from the scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method, comprising:
    determining at least one of a height field and an orientation field of a fiber-reinforced structure comprising a plurality of fiber portions and a polymer matrix;
    generating a reaction-diffusion representation of the fiber-reinforced structure by generating a hatching pattern or a heat map that indicates a concentration of at least one of the polymer matrix and the plurality of fiber portions;
    generating a two-phase representation of the fiber-reinforced structure based on the hatching pattern or heat map;
    designating a reference fiber deposition path based on the reaction-diffusion representation;
    generating a continuous fiber deposition path based on the reference fiber deposition path; and
    transmitting a signal representing the continuous fiber deposition path to a deposition device, the deposition device using the continuous fiber deposition path to deposit a fiber of the fiber-reinforced structure;
    wherein generating the continuous fiber deposition path includes identifying and tracing a perimeter of the two-phase representation of the fiber-reinforced structure.

2. The method of claim 1, wherein designating the reference fiber deposition path comprises:
    determining a length of each of the plurality of fiber portions; and
    designating a first fiber portion of the plurality of fiber portions as the reference fiber deposition path based on the length of each of the plurality of fiber portions.

3. The method of claim 2, wherein generating the continuous fiber deposition path based on the reference fiber deposition path comprises:
    identifying a second fiber portion of the plurality of fiber portions, wherein the second fiber portion is not connected to the first fiber portion; and
    joining the second fiber portion of the plurality of fiber portions with the first fiber portion.

4. The method of claim 2, wherein generating the continuous fiber deposition path based on the reference fiber deposition path comprises:
    identifying a set of the plurality of fiber portions, wherein each fiber portion of the set of the plurality of fiber portions is not connected to the first fiber portion; and
    joining each fiber portion of the set of the plurality of fiber portions with the first fiber portion.

5. The method of claim 1, further comprising determining a membership field of the fiber-reinforced structure.

6. The method of claim 1, wherein generating the reaction-diffusion representation of the fiber-reinforced structure comprises:
    simulating a diffusion of a substance into the plurality of fiber portions and the polymer matrix; and
    generating a graphical representation based on a permeability of the plurality of fiber portions and a permeability of the polymer matrix.

7. The method of claim 1, wherein generating the reaction-diffusion representation of the fiber-reinforced structure comprises:
    simulating at least one of:
        a diffusion of a substance into the plurality of fiber portions,
        a feed rate between the substance and the plurality of fiber portions, and
        a removal rate between the substance and the plurality of fiber portions; and
    determining a concentration of the plurality of fiber portions and a concentration of the polymer matrix; and
    generating a graphical representation based on the concentration of the plurality of fiber portions and the concentration of the polymer matrix.

8. A system comprising:
    one or more processors; and
    one or more nontransitory computer-readable mediums storing machine-readable instructions that, when executed, cause the one or more processors to:
        determine at least one of a height field and an orientation field of a fiber-reinforced structure, wherein the fiber-reinforced structure comprises a plurality of fiber portions and a polymer matrix;
        generate a reaction-diffusion representation of the fiber-reinforced structure, wherein the reaction-diffusion representation includes a hatching pattern or a heat map that indicates a concentration of at least one of the polymer matrix and the plurality of fiber portions;
        generate a two-phase representation of the fiber-reinforced structure based on the hatching pattern or heat map;
        designate a reference fiber deposition path based on the reaction-diffusion representation;
        generate a continuous fiber deposition path based on the reference fiber deposition path; and
        transmit a signal representing the continuous fiber deposition path to a deposition device, the deposition device using the continuous fiber deposition path to deposit a fiber of the fiber-reinforced structure;
        wherein the continuous fiber deposition path is generated by identifying and tracing a perimeter of the two-phase representation of the fiber-reinforced structure.

9. The system of claim 8, wherein the machine-readable instructions, when executed, further cause the one or more processors to:
    determine a length of each of the plurality of fiber portions; and
    designate a first fiber portion of the plurality of fiber portions as the reference fiber deposition path based on the length of each of the plurality of fiber portions.

10. The system of claim 9, wherein the machine-readable instructions, when executed, further cause the one or more processors to:
    identify a second fiber portion of the plurality of fiber portions, wherein the second fiber portion is not connected to the first fiber portion; and
    join the second fiber portion of the plurality of fiber portions with the first fiber portion.

11. The system of claim 9, wherein the machine-readable instructions, when executed, further cause the one or more processors to:
- identify a set of the plurality of fiber portions, wherein each fiber portion of the set of the plurality of fiber portions is not connected to the first fiber portion; and
- join each fiber portion of the set of the plurality of fiber portions with the first fiber portion.

12. The system of claim 8, wherein the machine-readable instructions, when executed, further cause the one or more processors to determine a membership field of the fiber-reinforced structure.

13. The system of claim 8, wherein the machine-readable instructions, when executed, further cause the one or more processors to:
- simulate a diffusion of a substance into the plurality of fiber portions and the polymer matrix; and
- generate a graphical representation based on a permeability of the plurality of fiber portions and a permeability of the polymer matrix.

14. The system of claim 8, wherein the machine-readable instructions, when executed, further cause the one or more processors to:
- simulate at least one of:
  - a diffusion of a substance into the plurality of fiber portions,
  - a feed rate between the substance and the plurality of fiber portions, and
  - a removal rate between the substance and the plurality of fiber portions; and
- determine a concentration of the plurality of fiber portions and a concentration of the polymer matrix; and
- generate a graphical representation based on the concentration of the plurality of fiber portions and the concentration of the polymer matrix.

15. A method comprising:
- determining, using one or more processors, at least one of a height field and an orientation field of a fiber-reinforced structure, wherein the fiber-reinforced structure comprises a plurality of fiber portions and a polymer matrix;
- generating, using the one or more processors, a reaction-diffusion representation of the fiber-reinforced structure by generating a hatching pattern or heat map, wherein the reaction-diffusion representation indicates a concentration of at least one of the polymer matrix and the plurality of fiber portions;
- generating, using the one or more processors, a two-phase representation of the fiber reinforced structure based on the hatching pattern or heat map of the reaction-diffusion representation;
- generating, using the one or more processors, a continuous fiber deposition path based on the two-phase representation; and
- transmitting, using the one or more processors, a signal representing the continuous fiber deposition path to a deposition device, the deposition device using the continuous fiber deposition path to deposit a fiber of the fiber-reinforced structure;
- wherein generating the continuous fiber path includes identifying and tracing a perimeter of the two-phase representation of the fiber-reinforced structure.

16. The method of claim 15, wherein generating the reaction-diffusion representation of the fiber-reinforced structure further comprises:
- simulating, using the one or more processors, a diffusion of a substance into the plurality of fiber portions and the polymer matrix; and
- generating, using the one or more processors, a graphical representation based on a permeability of the plurality of fiber portions and a permeability of the polymer matrix.

17. The method of claim 15, wherein generating the reaction-diffusion representation of the fiber-reinforced structure further comprises:
- simulating, using the one or more processors, at least one of:
  - a diffusion of a substance into the plurality of fiber portions,
  - a feed rate between the substance and the plurality of fiber portions, and
  - a removal rate between the substance and the plurality of fiber portions; and
- determining, using the one or more processors, a concentration of the plurality of fiber portions and a concentration of the polymer matrix; and
- generating, using the one or more processors, a graphical representation based on the concentration of the plurality of fiber portions and the concentration of the polymer matrix.

18. The method of claim 15, wherein generating the two-phase representation of the fiber reinforced structure based on the reaction-diffusion representation further comprises:
- generating, using the one or more processors, a first phase of the two-phase representation in response to a length of a portion of the reaction-diffusion representation being greater than a maximum constraint.

19. The method of claim 18, wherein generating the two-phase representation of the fiber reinforced structure based on the reaction-diffusion representation further comprises:
- generating, using the one or more processors, a second phase of the two-phase representation in response to each length of a plurality of portions of the reaction-diffusion representation being less than a minimum constraint.

* * * * *